UNITED STATES PATENT OFFICE.

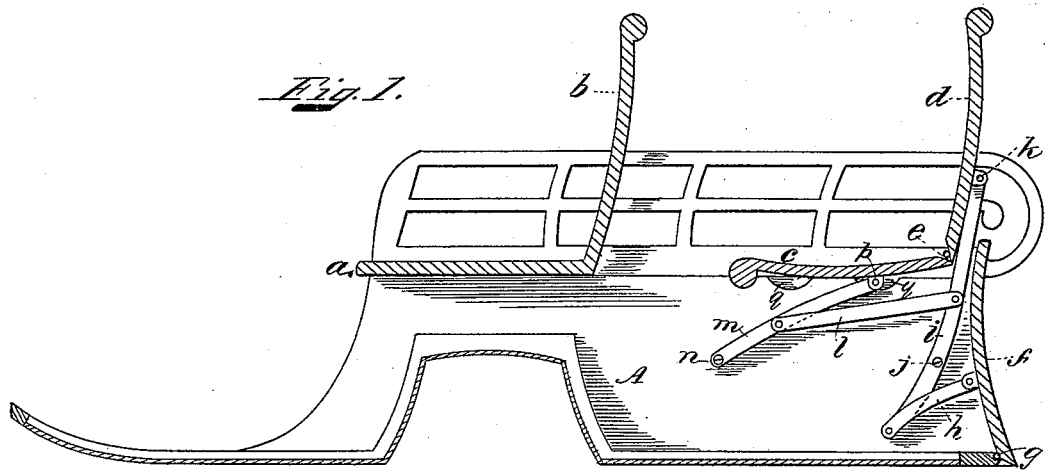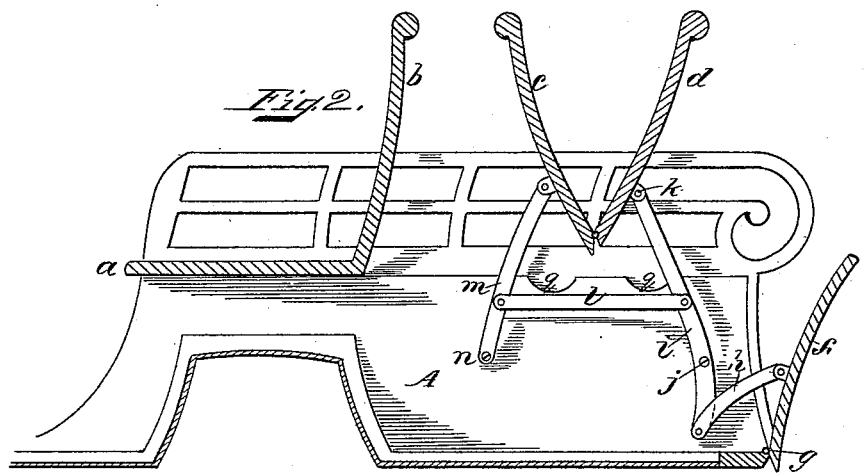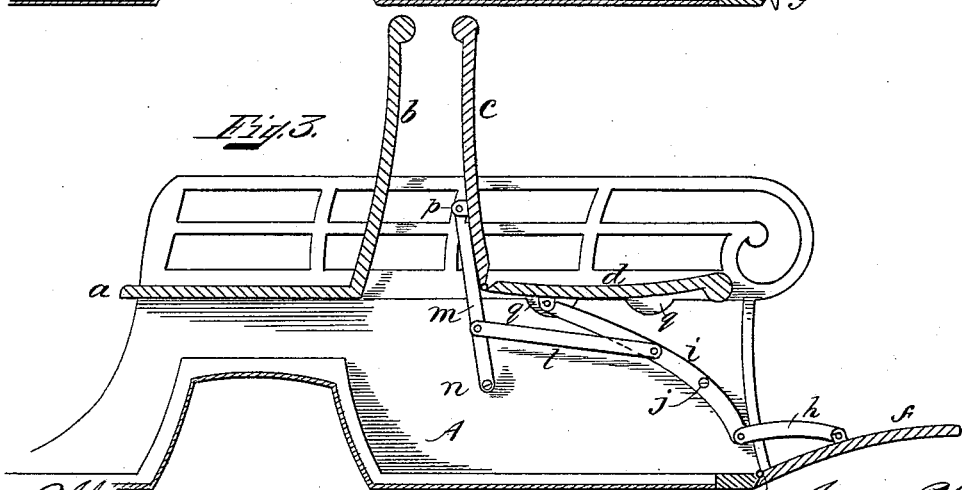

HARLAN P. WELLS AND OSGOOD MORRILL, OF AMESBURY, MASSACHUSETTS.

CARRIAGE-SEAT.

SPECIFICATION forming part of Letters Patent No. 447,591, dated March 3, 1891.

Application filed December 5, 1890. Serial No. 373,643. (No model.)

*To all whom it may concern:*

Be it known that we, HARLAN P. WELLS and OSGOOD MORRILL, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1 is a sectional elevation showing our invention, the section being vertical, through the floor of the carriage-body, the tail-board, and the rear seats, the front seat being shown in elevation, the seats being shown in position as when the occupants both face to the front. Fig. 2 is a view similar to Fig. 1, but showing the rear seat as when being reversed. Fig. 3 is a view similar to the preceding, but showing the rear seat as reversed, in order that the occupants may face to the rear.

The object of our invention is to provide a carriage in which are combined a fixed front seat and a reversible rear seat, which is actuated through certain mechanism by raising and lowering the tail-board; and it consists in features of novelty that will be hereinafter pointed out and claimed.

Referring again to said drawings, A represents the body of the carriage, which may be of such style as is preferable, the sides being of a height to constitute, in effect, the ends of the seats. The front seat is shown at $a$ and is provided with back $b$ of usual construction. The rear seat is formed with the parts or members $c\,d$, hinged together at $e$, the part $c$ constituting the bottom or seat proper when the seat is arranged for the occupants thereof to face to the front, as in Fig. 1, while it constitutes the back when the occupants face to the rear, as in Fig. 3, and when $c$ constitutes the bottom $d$ serves as the back, and vice versa. Said seat is reversed by action of the tail-board $f$ through the following coacting parts. The tail-board is hinged at $g$ to the lower rear corner of the body, and to it is pivoted the connector $h$, which at its inner end is pivoted to the lower end of jumping-iron $i$, which is pivotally attached to the side of the body at $j$, while its upper end is pivoted at $k$ to member $d$ of the seat at the proper distance above pivot $e$. In front of pivot $j$ the jumping-iron $m$ is pivoted at $n$ to the side of the body, and its upper end is pivoted at $p$ to member $c$ of the seat at the proper distance from pivot $e$, a connector $l$ being pivoted at its respective ends to $i$ and $m$ at equal distances above their respective pivotal fulcra $j\,n$.

It will be obvious from an inspection of the drawings that the closing (turning up) of tail-board $f$ will, through the conjoint action of connector $h$, irons $i\,m$, and connector $l$, position the rear seat, as in Fig. 1, as a forward-facing seat, while the opening (turning down) of the tail-board will, through the described agencies, reverse the rear seat to serve as a rearward-facing seat, as shown in Fig. 3. The position of the respective parts, as shown in Fig. 2, represents them as when the rear seat is in transition from its position in either Fig. 1 or Fig. 3 to the reverse position. The rear seat could be reversed by the specified mechanism, though parts $c\,d$ were rigidly secured together in the respective relations that they occupy in Figs. 1 and 3, provided either or both pivots $k\,p$ or pivots $j\,n$ were inserted in slots to admit a limited change of position of the parts at such point; but we prefer the construction shown. Upon each side of the body recesses $q\,q$ are provided to receive the projection upon parts $c\,d$, in which the jumping-irons are pivoted.

It will be obvious that the several devices by which the movement of the tail-board is communicated to the rear seat are in the usual and well-known manner duplicated at the two sides of the body.

We are aware that it is not new to arrange a seat upon a fixed pivot so that it may be turned thereon to face either way, and that in such case the bottom becomes the back, and vice versa; and hence we do not claim, broadly, a pivoted seat that may be turned thereon to face to the front or rear; but we are, we believe, the first to arrange a seat upon traveling instead of fixed pivots, so that in the act of moving the seat bodily from one position to another it is reversed or faced opposite to its former facing; and it is obvious that the tail-board and its connector may be omitted and yet our rear seat and its pivotal supports perform the same function as when the tail-board coacts therewith—as, for instance, the rear seat may be jumped by taking hold thereof and moving it forward, in which case the irons $i\,m$ would operate as if actuated in any other manner; and hence we do not limit ourselves to any specific device for applying the requisite force to the seat to jump it back and forth.

We claim as our invention—

1. The combination of a hinged tail-board, a seat provided with bottom and back at proper relative angles, a pair of jumping-irons pivoted at their lower ends to the body and at their opposite ends pivoted to the back and bottom of said seat, respectively, a rod pivotally connected with said irons between their said pivots, and a connector pivoted to said tail-board and a jumping-iron, all substantially as specified.

2. The combination of pivoted tail-board $f$, jumping-irons $i\,m$, respectively pivoted to the body and seat, connector $l$, pivoted to said jumping-irons, and connector $h$, pivoted to said tail-board and to jumping-iron $i$, substantially as specified.

3. The combination of the seat having its members $c\,d$ hinged together, the jumping-irons $i\,m$, pivoted to the body and respectively to members $c\,d$ of the seat, connector $l$, pivoted to said jumping-irons, and connector $h$, pivoted to iron $i$ and to the hinged tail-board $f$, substantially as specified.

4. The combination of a carriage-seat having members $c$ and $d$, each adapted to serve either as the bottom or back of the seat, and a pair of jumping-irons, respectively pivoted at one end to the body and at the other to one of said members of the seat, whereby when said seat is jumped the back becomes the bottom and the bottom the back, substantially as specified.

HARLAN P. WELLS.
OSGOOD MORRILL.

Witnesses:
  HARRY E. MILLIKEN,
  WILLIS B. RODGERS.